US005882573A

United States Patent [19]

Kwok et al.

[11] Patent Number: 5,882,573

[45] Date of Patent: Mar. 16, 1999

[54] ADHESIVE DISPENSING NOZZLES FOR PRODUCING PARTIAL SPRAY PATTERNS AND METHOD THEREFOR

[75] Inventors: Kui-Chiu Kwok, Mundelein, Ill.; Mel S. Lessley, Lakeside Park, Ky.

[73] Assignee: Illinois Tool Works Inc., Glenview, Ill.

[21] Appl. No.: 940,158

[22] Filed: Sep. 29, 1997

[51] Int. Cl.[6] .............................. B05B 7/06; B29C 47/06

[52] U.S. Cl. .......................... 264/510; 118/314; 118/325; 156/244.11; 156/500; 156/578; 264/171.13; 264/211.14; 425/72.2; 425/90; 425/113; 425/192 S; 425/463; 427/208.6; 427/256; 427/286; 427/422

[58] Field of Search .......................... 264/171.13, 211.14, 264/510; 425/72.2, 90, 113, 192 S, 463; 156/244.11, 500, 578; 427/208.6, 256, 286, 422; 118/314, 325

[56] References Cited

U.S. PATENT DOCUMENTS

| | | |
|---|---|---|
| Re. 33,158 | 2/1990 | Stouffer et al. . |
| Re. 33,159 | 2/1990 | Bauer . |
| Re. 33,448 | 11/1990 | Bauer . |
| Re. 33,481 | 12/1990 | Zeicker et al. . |
| Re. 33,605 | 6/1991 | Bauer . |
| 2,031,387 | 2/1936 | Schwarz . |
| 2,212,448 | 8/1940 | Modigliani . |
| 2,297,726 | 4/1942 | Stephanoff . |
| 2,628,386 | 2/1953 | Tornberg . |
| 3,038,202 | 6/1962 | Harkenrider . |
| 3,176,345 | 4/1965 | Powell . |
| 3,178,770 | 4/1965 | Willis . |
| 3,192,562 | 7/1965 | Powell . |
| 3,192,563 | 7/1965 | Crompton . |
| 3,204,290 | 9/1965 | Crompton . |
| 3,213,170 | 10/1965 | Erdmenger et al. . |
| 3,253,301 | 5/1966 | McGlaughlin . |
| 3,334,792 | 8/1967 | DeVries et al. . |
| 3,380,128 | 4/1968 | Cremer et al. . |

(List continued on next page.)

FOREIGN PATENT DOCUMENTS

| | | |
|---|---|---|
| 44-16168 | 7/1969 | Japan . |
| 756907 | 9/1956 | United Kingdom . |
| 1392667 | 4/1975 | United Kingdom . |
| WO93/15895 | 8/1993 | WIPO . |

OTHER PUBLICATIONS

Nonwovens World Magazine, “Meltdown Technology Today”, 1989, pp. 1–158.

The New Non–Wovens World, “Developments in Melt Blowing Technology”, Summer 1993, pp. 73–82.

Gregory F. Ward, “Micro–Denier Nonwoven Process and Fabrics”, on or about 17 Oct. 1997, pp. 1–9.

Edward K. McNally et al., J & M Laboratories, “Durafiber®/Durastitch™ Adhesives Applications Method Featureing Solid State Application Technology”, disclosed on 8 Sep. 1997 at Inda–Tec 97 Meeting, Cambirde MA, pp. 26.1–26.8.

*Primary Examiner*—Leo B. Tentoni

[57] ABSTRACT

A system and method for applying fluids, including fiberized hot melt adhesive, onto a substrate from one or more meltblowing die assemblies mounted on a manifold that supplies fluid thereto. At least one of the die assemblies is selected from a group of die assemblies having different configurations of fluid dispensing orifices, wherein various combinations of the different die assembly configurations are mountable onto the manifold to provide a wide range of partial fluid dispensing patterns onto the substrate. Each of the plurality of fluid dispensing orifices are flanked by an air dispensing orifice disposed on opposing sides thereof, wherein air dispensing orifices may extend across a portion of the remaining portion of the meltblowing die assembly void of fluid dispensing orifices. At least one of the die assemblies having air dispensing orifices arranged relative to the fluid dispensing orifices to increasingly decrease an oscillation amplitude of fluid dispensed from the fluid dispensing orifices approaching an endmost fluid dispensing orifice thereof.

46 Claims, 2 Drawing Sheets

U.S. PATENT DOCUMENTS 3,488,806 1/1970 De Cecco et al. .
3,492,692 2/1970 Soda et al. .
3,501,805 3/1970 Douglas, Jr. et al. .
3,613,170 10/1971 Soda et al. .
3,650,866 3/1972 Prentice .
3,704,198 11/1972 Prentice .
3,755,527 8/1973 Keller et al. .
3,825,379 7/1974 Lohkamp et al. .
3,849,241 11/1974 Butin et al. .
3,861,850 1/1975 Wallis .
3,874,886 4/1975 Levecque et al. .
3,888,610 6/1975 Brackmann et al. .
3,920,362 11/1975 Bradt .
3,923,444 12/1975 Esper et al. .
3,942,723 3/1976 Langdon .
3,947,537 3/1976 Buntin et al. .
3,970,417 7/1976 Page .
3,978,185 8/1976 Buntin et al. .
3,981,650 9/1976 Page .
4,007,625 2/1977 Houben et al. .
4,015,963 4/1977 Levecque et al. .
4,015,964 4/1977 Levecque et al. .
4,050,866 9/1977 Kilsdonk .
4,052,002 10/1977 Stouffer et al. .
4,052,183 10/1977 Levecque et al. .
4,100,324 7/1978 Anderson et al. .
4,145,173 3/1979 Pelzer et al. .
4,151,955 5/1979 Stouffer .
4,185,981 1/1980 Ohsato et al. .
4,189,455 2/1980 Raganato et al. .
4,277,436 7/1981 Shah et al. .
4,300,876 11/1981 Kane et al. .
4,340,563 7/1982 Appel et al. .
4,359,445 11/1982 Kane et al. .
4,380,570 4/1983 Schwarz .
4,457,685 7/1984 Huang et al. .
4,526,733 7/1985 Lau .
4,596,364 6/1986 Bauer .
4,645,444 2/1987 Lenk et al. .
4,652,225 3/1987 Dehennau et al. .
4,694,992 9/1987 Stouffer .
4,708,619 11/1987 Balk .
4,746,283 5/1988 Hobson .
4,747,986 5/1988 Chao .
4,785,996 11/1988 Ziecker et al. .
4,812,276 3/1989 Chao .
4,818,463 4/1989 Buehning .
4,818,464 4/1989 Lau .
4,826,415 5/1989 Mende .
4,874,451 10/1989 Boger et al. .
4,889,476 12/1989 Buehning .
4,905,909 3/1990 Woods .
4,923,706 5/1990 Binley et al. .
4,949,668 8/1990 Heindel et al. .
4,955,547 9/1990 Woods .
4,983,109 1/1991 Miller et al. .
5,013,232 5/1991 Way .
5,017,116 5/1991 Carter et al. .
5,035,361 7/1991 Stouffer .
5,066,435 11/1991 Lorenz et al. .
5,067,885 11/1991 Stevenson et al. .
5,069,853 12/1991 Miller .
5,094,792 3/1992 Baran .
5,098,636 3/1992 Balk .
5,114,752 5/1992 Hall .................................... 427/286 X
5,129,585 7/1992 Bauer .
5,145,689 9/1992 Allen et al. .
5,165,940 11/1992 Windley .
5,207,970 5/1993 Joseph et al. .
5,260,003 11/1993 Nyssen et al. .
5,269,670 12/1993 Allen et al. .
5,342,647 8/1994 Heindel et al. .
5,354,378 10/1994 Hauser et al. .
5,407,619 4/1995 Maeda et al. .
5,409,733 4/1995 Boger et al. .
5,418,009 5/1995 Raterman et al. .
5,421,921 6/1995 Gill et al. .
5,421,941 6/1995 Allen et al. .
5,423,935 6/1995 Benecke et al. .
5,429,840 7/1995 Raterman et al. .
5,445,509 8/1995 Allen et al. .
5,458,291 10/1995 Brusko et al. .
5,458,721 10/1995 Raterman .
5,478,224 12/1995 McGuffey .
5,503,784 4/1996 Balk .
5,524,828 6/1996 Raterman et al. .
5,533,675 7/1996 Benecke et al. .
5,540,804 7/1996 Raterman .
5,605,706 2/1997 Allen et al. .
5,618,347 4/1997 Clare et al. ............................ 118/314
5,618,566 4/1997 Allen et al. .
5,620,139 4/1997 Ziecker .
5,679,379 10/1997 Fabbricante et al. .

ADHESIVE DISPENSING NOZZLES FOR PRODUCING PARTIAL SPRAY PATTERNS AND METHOD THEREFOR

CROSS REFERENCE TO RELATED APPLICATIONS

The present application is related to copending U.S. application Ser. No. 08/717,080 entitled "Meltblowing Method and Apparatus" filed 10 Oct. 1996 and copending U.S. application Ser. No. 08/843,224 entitled "Improved Meltblowing Method and System" filed 14 Apr. 1997, both of which are commonly assigned and incorporated by reference herein.

BACKGROUND OF THE INVENTION

The invention relates generally to systems and methods for dispensing fluids onto moving substrates, and more particularly to adhesive dispensing nozzle configurations for dispensing adhesives in partial spray patterns for partially covering a substrate, and still more particularly to meltblown adhesive dispensing systems including a manifold that supplies adhesive to a plurality meltblowing die assemblies configured for partially covering a substrate with adhesive.

The application of adhesives onto moving substrates is known and has many applications. Adhesives are used, for example, to bond overlapping substrate layers in the production of a variety of bodily fluid absorbing hygienic articles, including disposable diapers and incontinence pads, sanitary napkins, patient underlays, and surgical dressings. Known systems include generally a plurality of adhesive dispensing spray nozzles arranged in one or more arrays extending across a moving substrate for applying an adhesive layer or film thereon. Other systems include one or more die assemblies having a plurality of adhesive dispensing orifices arranged in an array, wherein the die assemblies are sometimes arrangeable side by side to extend the array lengthwise. U.S. application Ser. No. 08/843,224 entitled "Improved Meltblowing Method and System" filed 14 Apr. 1997 discloses a plurality of meltblowing die assemblies, or nozzles, mountable side by side on one or both ends of a common manifold, or head, which provides a metered supply of adhesive to each die assembly. The die assemblies each comprise a plurality of substantially parallel plate members forming an array of adhesive dispensing orifices on a dispensing surface thereof. The array of fluid dispensing orifices of each die assembly compose a section of a longer array formed by the plurality of adjacent die assemblies disposed along a common end of the manifold. One or both sides of the manifold may be mounted adjacent the side of a similarly configured manifold to form still longer arrays of fluid dispensing orifices, thereby providing a modular meltblowing adhesive dispensing system that accommodates substrates having any dimensional width.

In some adhesive dispensing applications, the adhesive is applied to cover the full width of the substrate, and in other applications it is desirable to apply the adhesive to cover only select portions of the substrate leaving other portions thereof without adhesive coverage. In the manufacture of bodily fluid absorbing hygienic articles, for example, it is desirable to form different sized areas of adhesive non-coverage, which may correspond to cut away areas thereof or may be designated for insertion of an elastic band. In these and other applications the areas of adhesive non-coverage may be as narrow as one-eighth of an inch or less and may be as wide as one or many inches, depending on the particular application requirements.

In the past, the supply of adhesive from the manifold to one or more die assemblies has been interrupted to provide one or more corresponding gaps in adhesive coverage on the substrate. U.S. Pat. No. 5,421,941 entitled "Method of Applying an Adhesive" issued on 6 Jun. 1995 to Allen et al. among related patents, for example, disclose a common manifold for selectively intermittently supplying adhesive to a series of meltblowing die assemblies mounted thereon. In FIGS. 1 and 4 of U.S. Pat. No. 5,421,941, the die assemblies are constructed to leave continuous strips of adhesive non-coverage along the length of the substrate, but the particular structure that provides this effect is not disclosed specifically. Notably, in FIG. 2 of U.S. Pat. No. 5,421,941, the side by side arrangement of die assemblies does not provide consistent spacing between the fluid dispensing orifices thereof, evidenced by a gap between the orifices of adjacent die assemblies, suggesting that adhesive coverage on the substrate is not continuous, or at least not uniform, particularly in areas between adjacent die assemblies void of fluid dispensing orifices.

The selective interruption of adhesive supplied to one or more die assemblies to form areas of adhesive non-coverage limits the corresponding gaps or areas of non-coverage to the width of the die assembly to which fluid flow is interrupted, and more generally in proportion to multiples of the spray pattern width corresponding thereto, provided the system comprises several die assemblies having the same width. In U.S. application Ser. No. 08/843,224 entitled "Improved Meltblowing Method and System" referenced above, the meltblowing die assemblies are one inch wide, and generally produce a substantially correspondingly wide spray pattern on the substrate. Thus, interruption of fluid flow to the die assembly or replacement thereof by a blocking plate, which may recirculate fluid back to the manifold, results in an area of adhesive non-coverage approximately inch wide, depending upon the divergence or convergence of adhesive sprayed from adjacent die assemblies.

Some adhesive dispensing manifolds are configured with an array of adhesive dispensing nozzles on opposing end portions thereof, wherein the array of die assemblies on one end of the manifold are offset relative to the array of die assemblies on the other end of the manifold. The offset is usually one-half the width of the die assembly. The gap or area of adhesive non-coverage may thus be reduced to a dimension corresponding to the amount of offset upon interruption of fluid flow to overlapping die assemblies on opposing ends of the manifold. But this approach continues to limit the area of adhesive non-coverage in proportion to multiples of the offset between die assemblies, which is fixed.

Others have suggested rotating or otherwise tilting the manifold relative to the moving substrate to variably reduce the areas of adhesive non-coverage resulting from interruption of the fluid supply or removal of one or more die assemblies from the manifold. This approach however does not provide precise and consistent control of the gaps or areas not covered by adhesive. And, as with the other approaches discussed, does not permit variability among more than one area of adhesive non-coverage, since rotating or tilting the manifold reduces each gap the same extent.

The present invention is drawn toward advancements in the art of dispensing fluids onto moving substrates that overcome problems in the prior art economically.

It is an object of the invention generally to provide novel nozzle configurations for dispensing fluids, and more particularly to provide novel modular meltblown adhesive dispensing systems including a manifold that supplies adhesive to one or more meltblowing die assemblies having various configurations for partially covering substrates with adhesives.

It is a more particular object of the invention to provide novel systems and methods for applying fluids, including fiberized hot melt adhesives, onto substrates from one or more die assemblies mounted on a manifold that supplies fluid thereto. At least one of the die assemblies is selected from a group of die assemblies each having different configurations of fluid dispensing orifices thereon, wherein various combinations of the different die assembly configurations are mountable onto the manifold to provide a wide range of partial fluid dispensing patterns onto the substrate, thereby accommodating any fluid dispensing application.

It is still a more particular object of the invention to provide novel systems and methods for applying fluids, including fiberized hot melt adhesives, onto substrates from one or more die assemblies mounted on a manifold that supplies fluid thereto. The one or more die assemblies are selected from a group of die assemblies having the following configurations generally. A first die assembly configured with a first plurality of fluid dispensing orifices disposed across a left side portion thereof, and with a remaining right side portion thereof void of fluid dispensing orifices. A second die assembly configured with a second plurality of fluid dispensing orifices disposed across a right side portion thereof, and with a remaining left side portion thereof void of fluid dispensing orifices. A third die assembly configured with a third plurality of fluid dispensing orifices disposed across a third intermediate portion thereof, and with remaining right and left lateral side portions thereof void of fluid dispensing orifices. And a fourth die assembly configured with a fourth plurality of fluid dispensing orifices disposed across right and left lateral side portions thereof, and with a remaining fourth intermediate portion thereof void of fluid dispensing orifices.

It is another object of the invention to provide novel systems and methods for applying fluids, including fiberized hot melt adhesives, onto substrates from a plurality of die assemblies mounted on a common mounting surface of a manifold that supplies fluid thereto. It is a related alternative object of the invention to arrange the plurality of die assemblies on the manifold so that the plurality of fluid dispensing orifices of the plurality of die assemblies form not more than a single substantially linear array of fluid dispensing orifices.

It is another object of the invention to provide novel systems and methods for applying fluids, including fiberized hot melt adhesives, onto substrates from one or more meltblowing die assemblies mountable on a manifold. The meltblowing die assemblies each have generally a plurality of fluid dispensing orifices disposed at least partially across a width thereof, wherein any remaining portion of the die assemblies is void of fluid dispensing orifices, thereby forming a partial spray pattern. Each of the plurality of fluid dispensing orifices are flanked by an air dispensing orifice disposed on opposing sides thereof, wherein the air dispensing orifices extend across at least a portion of any remaining portion of the meltblowing die assembly void of fluid dispensing orifices.

It is a further object of the invention to provide novel systems and methods for applying fluids, including fiberized hot melt adhesives, onto substrates from one or more meltblowing die assemblies mountable on a manifold. The meltblowing die assemblies each have a plurality of fluid dispensing orifices disposed at least partially across a width thereof, wherein the fluid dispensing orifices are flanked by air dispensing orifices disposed on opposing sides thereof. At least one of the die assemblies having air dispensing orifices arranged relative to the fluid dispensing orifices to increasingly decrease an oscillation amplitude of fluid dispensed from fluid dispensing orifices approaching an endmost fluid dispensing orifice defining an interface between areas of adhesive coverage and non-coverage on the substrate. It is a related alternative object of the invention to size the fluid dispensing orifices in proportion to the amplitude of fluid oscillation therefrom, whereby the supply of fluid thereto decreases with decreasing fluid oscillation amplitude.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

DETAILED DESCRIPTION OF THE INVENTION

Figure 1:
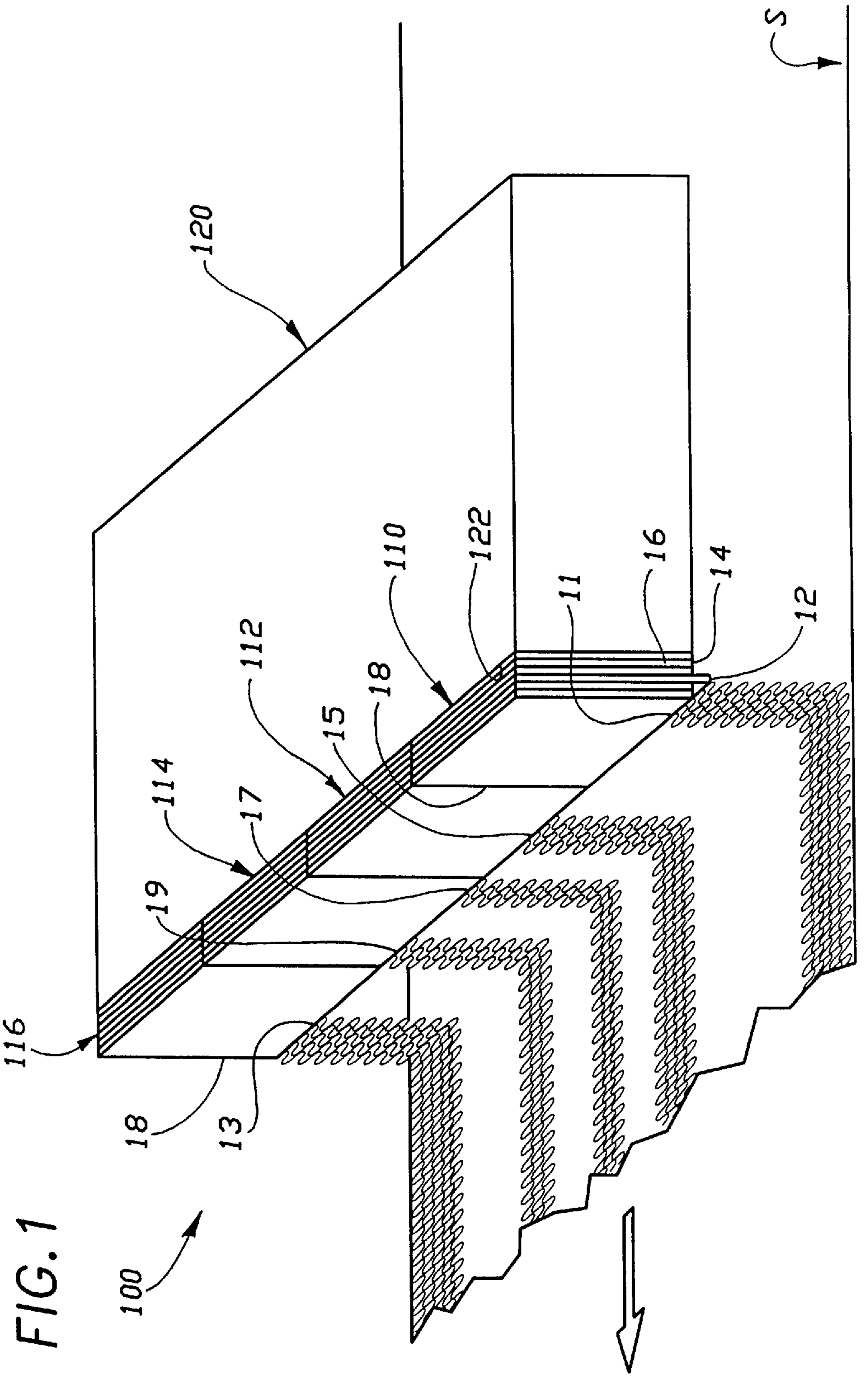
FIG. 1 is a modular system for applying fluids including fiberized adhesives onto substrates according to an exemplary embodiment of the invention.

FIG. 1 is a system 100 for applying fluids including fiberized adhesives onto a substrate S, which in the exemplary embodiment is a material used in the manufacture of bodily fluid absorbing hygienic articles, including disposable diapers and incontinence pads, sanitary napkins, patient underlays, and surgical dressings. The invention is more generally applicable to selectively applying fluids to portions of any substrate.

The system 100 comprises generally a plurality of die assemblies 110–116 mountable side by side on a common manifold 120, or head, and more particularly on one or both ends 122 thereof, which provides a metered supply of adhesive thereto, whereby the die assemblies and manifold form a modular assembly as disclosed more fully in copending U.S. application Ser. No. 08/843,224 entitled "Improved Meltblowing Method and System" filed 14 Apr. 1997 referenced hereinabove. In other embodiments, however, one or more die assemblies are mounted onto the manifold.

The plurality of die assemblies 110 of the exemplary embodiments each include a plurality of fluid dispensing orifices 12 disposed on a dispensing surface 14 thereof. The fluid dispensing orifices 12 are arranged at least partially across a width extending from a right side 16 of the die assembly to a left side 18 thereof. The die assemblies of the exemplary embodiments are, more particularly, meltblowing die assemblies, or nozzles, mountable on a manifold to form a modular assembly useable for dispensing or spraying fiberized hot melt adhesives onto substrates. The meltblowing die assemblies of this preferred exemplary type each comprise generally a plurality of laminated members, or plates, defining the plurality of fluid dispensing orifices 12 as disclosed more fully in copending U.S. application Ser. No. 08/717,080 entitled "Meltblowing Method and Apparatus" and in copending U.S. application Ser. No. 08/843,224 entitled "Improved Meltblowing Method and System", both referenced hereinabove. The die assemblies 110 may alternatively be of the type disclosed in U.S. Pat. No. 5,421,941 entitled "Method of Applying An Adhesive" also referenced hereinabove, wherein the orifices are formed by precision drilling operations, among other types of die assemblies mountable onto a manifold to form a modular assembly.

In one preferred embodiment, the plurality of die assemblies 110–116 are mountable on a common mounting surface 122 of the manifold 120 to form the modular assembly. And in a related preferred embodiment, the plurality of die assemblies are arranged on the manifold 120 so that the plurality of fluid dispensing orifices 12 thereof form not more than a single substantially linear array of fluid dispensing orifices. The single substantially linear array of fluid dispensing orifices may however be piece-wise linear insofar as the invention is directed toward partially covering the substrate S with fluids dispensed from die assemblies 110 having fluid dispensing orifices selectively disposed on or across portions thereof and not on other remaining portions thereof as discussed further below. And although the plurality of die assemblies are configured to dispense or spray partial fluid patterns onto the substrate S as discussed further below, die assemblies positioned adjacently on the manifold 120 are preferably configured generally to provide a substantially continuous, or seamless, application of fluid onto the substrate, except in areas of the substrate where adhesive non-coverage is desired. Alternatively, the plurality of die assemblies may be arranged to form one or more arrays of fluid dispensing orifices on one or both ends of the manifold 120, wherein the one or more arrays of fluid dispensing orifices are configured selectively to produce areas of adhesive non-coverage onto the substrate.

FIG. 1 illustrates generally the plurality of die assemblies 110–116 having a plurality of fluid dispensing orifices 12 disposed on select portions of the dispensing surface 14 and other remaining portions thereof void of fluid dispensing orifices 12. The fluid dispensing orifices 12 are not shown clearly in FIG. 1, but the illustrated partial fluid dispensing, or spraying, patterns corresponding thereto are indicative of the locations of the fluid dispensing orifices 12, which are illustrated more particularly in FIGS. 2*a*–2*c* and discussed further below. The plurality of die assemblies 110–116 thus apply fluid only to portions of the substrate substantially opposite the fluid dispensing orifices thereon, and not to other portions of the substrate substantially opposite the remaining portions thereof void of fluid dispensing orifices.

Generally, at least one of the die assemblies mounted on the manifold 120 is selected from a group consisting essentially of die assemblies that dispense one of the exemplary partial fluid patterns illustrated generally in FIG. 1 and discussed further below. More generally, each of a plurality of die assemblies mounted on the manifold may be, but is not necessarily, selected from a corresponding group to form combinations thereof suitable for a particular application. Notably, the exemplary die assembly configurations of FIG. 1 provide partial dispensing patterns not obtainable by blocking or interrupting fluid supplied to one or more die assemblies having orifices disposed across the full width between right and left sides thereof.

FIG. 1 illustrates the exemplary die assembly 110 including a plurality of fluid dispensing orifices 12 disposed across a right side portion 11 of the dispensing surface 14 thereof, and extending from the right side 16 of the die assembly 110 toward an intermediate portion thereof. A remaining portion of the dispensing surface 14 extending from the intermediate portion thereof toward the left side of the die assembly 110 is void of fluid dispensing orifices. The die assembly 110 thus applies fluid to portions of the substrate substantially opposite the fluid dispensing orifices on the right side portion 11 thereof, but not to other portions of the substrate substantially opposite the remaining portion of the die assembly 110 void of fluid dispensing orifices.

FIG. 1 illustrates the exemplary die assembly 116 including a plurality of fluid dispensing orifices 12 disposed across a left side portion 13 of the dispensing surface 14 thereof, and extending from the left side 18 of the die assembly 116 toward a first intermediate portion thereof. A remaining portion of the dispensing surface 14 extending from the intermediate portion thereof toward the right side of the die assembly 116 is void of fluid dispensing orifices. The die assembly 116 thus applies fluid to portions of the substrate substantially opposite the fluid dispensing orifices on the left side portion 13 thereof, but not to other portions of the substrate substantially opposite the remaining portion of the die assembly 116 void of fluid dispensing orifices.

The die assemblies 110 and 116 are generally reverse configurations of each other, and in some applications may be exact mirror images of each other, wherein generally the fluid dispensing orifices of one die assembly are disposed on the opposite side thereof as the fluid dispensing orifices of the other die assembly. The widthwise portion of the dispensing surface 14 having the fluid dispensing orifices 12 is however generally different for the die assemblies 110 and 116. Generally, the die assemblies 110 and 116 are mountable side by side on the manifold 120 so that the corresponding fluid dispensing orifices 12 thereof are positionable adjacent each other or separated from each other by the corresponding remaining portions thereof void of fluid dispensing orifices.

FIG. 1 illustrates the exemplary die assembly 112 including a plurality of fluid dispensing orifices 12 disposed across an intermediate portion 15 of the dispensing surface 14 thereof. The fluid dispensing orifices 12 are spaced away from the right and left sides 16 and 18 of the second die assembly 112, wherein remaining right and left lateral portions of the dispensing surface 14 thereof are void of fluid dispensing orifices. The die assembly 112 thus applies fluid to portions of the substrate substantially opposite the fluid dispensing orifices 12 on the intermediate portion 15 thereof, but not to other portions of the substrate substantially opposite the remaining right and left lateral portions of the die assembly 112 void of fluid dispensing orifices.

FIG. 1 illustrates also the exemplary die assembly 114 including a plurality of fluid dispensing orifices 12 disposed across right and left lateral portions 17 and 19 of the dispensing surface 14 thereof, and extending inwardly from the right and left sides 16 and 18 of the die assembly 114. A remaining intermediate portion of the dispensing surface 14 spaced away from the right and left sides 16 and 18 of the die assembly 114 is void of fluid dispensing orifices. The die assembly 114 thus applies fluid to portions of the substrate substantially opposite the fluid dispensing orifices 12 on the right and left lateral portions 17 and 19 thereof, but not to other portions of the substrate substantially opposite the remaining intermediate portion of the die assembly 114 void of fluid dispensing orifices.

In hot melt adhesive spraying applications applied with a meltblowing die assembly of the type disclosed in the copending U.S. application Ser. No. 08/717,080 entitled "Meltblowing Method and Apparatus" and in copending U.S. application Ser. No. 08/843,224 entitled "Improved Meltblowing Method and System", presently, the minimum reasonably controllable area of adhesive coverage or adhesive non-coverage on the substrate is approximately ⅛ inches. Although in other applications, the minimum controllable area may be less, depending on several parameters including the spacing between the die assembly and the substrate.

Thus, in one exemplary embodiment, the right and left side portions 11 and 13 of the dispensing surfaces 14 of the die assemblies 110 and 116 having the plurality of fluid dispensing orifices 12 has a minimum width of approximately 1/16 inches. Similarly, the remaining portion of the dispensing surface 14 void of fluid dispensing orifices has a minimum width of approximately 1/16 inches. As discussed above, the die assemblies 110 and 116 may thus be positioned adjacent to each other to form either a minimum ⅛ inch wide area of fluid coverage on the substrate or a minimum ⅛ inch wide area of fluid non-coverage on the substrate. These widths may generally be much larger so long as the minimum width of the complementary portion with or without fluid dispensing orifices is not less than its specified minimum, which in the exemplary embodiment is 1/16 inches for the general configurations of die assemblies 110 and 116.

According to the exemplary embodiment, a one inch wide die assembly having fluid dispensing orifices 12 disposed along 1/16 inches of the right or left side portion of the dispensing surface 14 thereof thus has approximately 15/16 inches of the remaining portion of the dispensing surface 14 void of fluid dispensing orifices. And similarly, a one inch wide die assembly having fluid dispensing orifices 12 disposed along 15/16 inches of the right or left side portion of the dispensing surface 14 thereof has approximately 1/16 inches of the remaining portion of the dispensing surface 14 void of fluid dispensing orifices.

In the exemplary embodiment, the intermediate portion 15 of the die assembly 112 having the plurality of fluid dispensing orifices has a minimum width of approximately ⅛ inches, and the remaining right and left lateral side portions of the die assembly 112 void of fluid dispensing orifices have minimum widths of approximately 1/16 inches. Similarly, the right and left lateral side portions 17 and 19 of the die assembly 115 having the plurality of fluid dispensing orifices have minimum widths of approximately 1/16 inches, and the remaining intermediate portion of the die assembly 114 void of fluid dispensing orifices has a minimum width of approximately ⅛ inches.

The exemplary die assemblies illustrated generally in FIG. 1 and disclosed more particularly above may be used generally in combination with one another and with other die assemblies having fluid dispensing orifices 12 disposed across a full width of the dispensing surface 14, not shown but disclosed in copending U.S. application Ser. No. 08/717,080 entitled "Meltblowing Method and Apparatus" and in copending U.S. application Ser. No. 08/843,224 entitled "Improved Meltblowing Method and System" filed, both reference hereinabove.

The fluid supplied to any one or more of the die assemblies mounted on the manifold 120 may be interrupted to provide additional control over fluid applied or sprayed onto the substrate. Additionally, one or more die assemblies, usually those having fluid dispensing orifices disposed across a full width thereof, may be removed and replaced with a blocking plate, which may recirculate fluid back to the manifold, as is known. The particular combination of die assemblies mounted on the manifold 120 is dependant generally on the particular application requirements. The availability of die assemblies that dispense a variety of partial fluid patterns shown generally in FIG. 1 and discussed more particularly herein substantially improves the adaptability and range of applications for modular fluid dispensing systems having one or more die assemblies mountable on a manifold for applying fluids, and especially spraying fiberized hot melt adhesive, onto substrates.

As discussed above, the die assemblies 110 of the exemplary embodiment each comprise a plurality of substantially parallel plate members, shown generally in FIG. 1, forming the fluid dispensing orifices 12, wherein each of the plurality of fluid dispensing orifices 12 of the plurality of die assemblies is flanked by an air dispensing orifice disposed on opposing sides of the fluid dispensing orifice, as disclosed more fully in copending U.S. application Ser. No. 08/717,080 entitled "Meltblowing Method and Apparatus" and in copending U.S. application Ser. No. 08/843,224 entitled "Improved Meltblowing Method and System", both reference hereinabove.

Figure 2C:
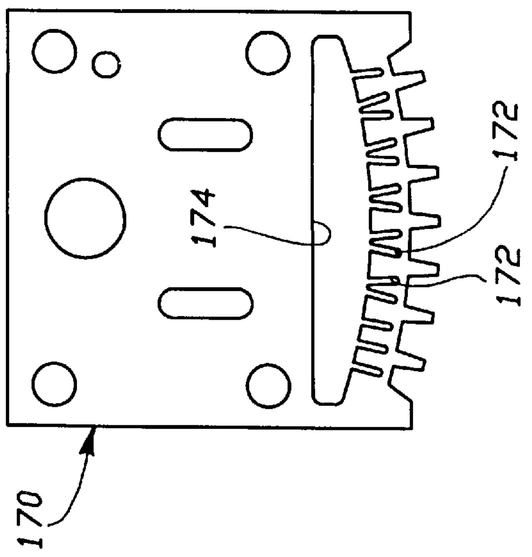
FIG. 2*c* is a third modified plate for dispensing partial fluid patterns from a meltblowing die assembly.
Figure 2B:
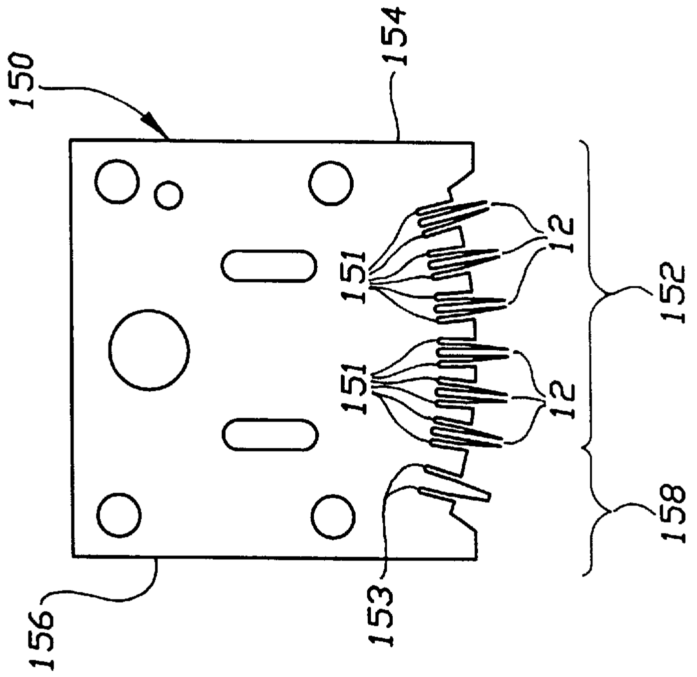
FIG. 2*b* is a second modified plate for dispensing partial fluid patterns from a meltblowing die assembly.
Figure 2A:
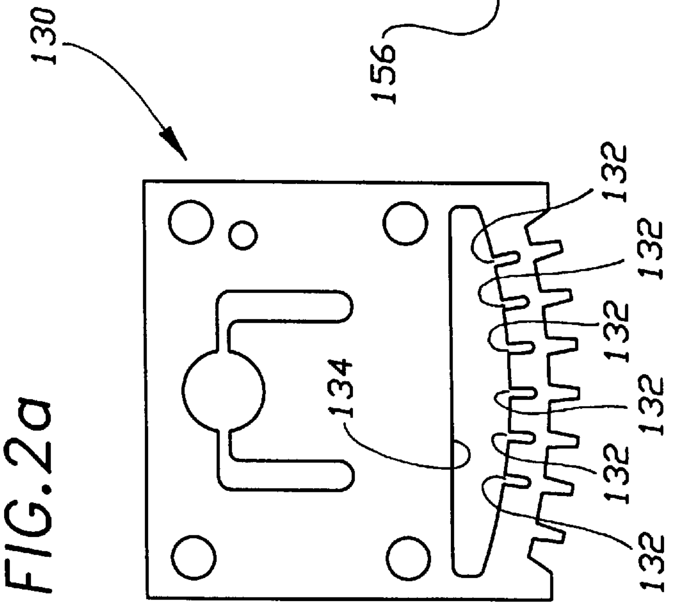
FIG. 2*a* is a first modified plate for dispensing partial fluid patterns from a meltblowing die assembly.

FIGS. 2*a*–2*c* illustrate three exemplary plates 130, 150 and 170 composing in combination a portion of a meltblowing die assembly comprising a plurality of substantially parallel plates defining a plurality of fluid dispensing orifices arranged partially across a width extending from a right side of the die assembly to a left side thereof. The three plates of FIGS. 2*a*–2*c* are, more particularly, useable to replace the three plates illustrated in FIGS. 2*d*–2*f* of U.S. application Ser. No. 08/843,224 entitled "Improved Meltblowing Method and System", thereby forming a meltblowing die assembly having a partial fluid dispensing pattern illustrated generally by the die assembly 110 in FIG. 1. The plates of FIGS. 2*a*–2*c* may also be configured to form meltblowing die assemblies having one of the partial fluid dispensing patterns illustrated generally by the die assemblies 112, 114 and 116 in FIG. 1 and disclosed more particularly hereinabove.

The exemplary plate of FIG. 2*b* includes a plurality of fluid dispensing orifices 12 disposed across a dispensing surface portion 152 between right and left sides 154 and 156 thereof. A remaining dispensing surface portion 158 is void of fluid dispensing orifices 12, whereby the corresponding die assembly incorporating the plate 150 produces a partial fluid dispensing pattern of the form illustrated generally by the die assembly 110 of FIG. 1. The plate 130 includes a corresponding plurality of fluid supply conduit portions 132, which supply fluid from a common fluid cavity 134 of the plate 130, in communication with a corresponding one of the plurality of fluid dispensing orifices 12 of the plate 150 when the plates 130 and 150 are matably coupled as disclosed more fully in U.S. application Ser. No. 08/843,224 entitled "Improved Meltblowing Method and System". The plates 130 and 150 may of course be configured to produce any one of the partial fluid dispensing patterns illustrated generally in FIG. 1 and disclosed more particularly hereinabove. The plate 150 may also include fluid dispensing orifices having greater or lesser density, depending on application requirements.

FIG. 2*b* illustrates each of the plurality of fluid dispensing orifices 12 flanked by an air dispensing orifice 151 disposed on opposing sides of the corresponding fluid dispensing orifice 12. The plate 170 includes a corresponding plurality of air supply conduit portions 172, which supply air from a common air cavity 174 of the plate 170, in communication with a corresponding one of the plurality of air dispensing orifices 151 of the plate 150 when the plates 170 and 150 are matably coupled as disclosed more fully in U.S. application Ser. No. 08/843,224 entitled "Improved Meltblowing Method and System" referenced hereinabove. The spacing and relative angle between the fluid and air orifices affects oscillation parameters of fluid dispensed therefrom including the frequency and amplitude thereof as discussed more fully in copending U.S. application Ser. No. 08/717,080 entitled "Meltblowing Method and Apparatus" and in copending U.S. application Ser. No. 08/843,224 entitled "Improved Meltblowing Method and System", both reference hereinabove.

FIG. 2*b* also illustrates an alternative embodiment wherein the remaining dispensing surface portion 158 void of fluid dispensing orifice 12 includes air dispensing orifices 153. The air dispensing orifices 153 improve fluid flow control by reducing a tendency of fluid dispensed from the endmost fluid dispensing orifices 12 to diverge, or stray laterally, thereby providing a more well defined boundary or interface between areas fluid coverage and non-coverage on the substrate. In the plate of FIG. 2*b*, for example, without the air dispensing orifices 153, the leftmost fluid dispensing orifices, and particularly the leftmost orifice, has a tendency to diverge toward the left side 158 of the plate or corresponding die assembly. The general concept of providing one or more additional air dispensing orifices adjacent an endmost fluid dispensing orifice to provide improved control over fluid dispensed therefrom, particularly where the endmost fluid dispensing orifice defines an interface between areas of fluid coverage and non-coverage on the substrate, is applicable to any of the die assemblies disclosed herein as well as to the meltblowing die assemblies disclosed in copending U.S. application Ser. No. 08/717,080 entitled "Meltblowing Method and Apparatus" and in copending U.S. application Ser. No. 08/843,224 entitled "Improved Meltblowing Method and System", both reference hereinabove.

According to another aspect of the invention, control over the boundary or interface between areas of the substrate having fluid coverage and non-coverage is improved by decreasing the amplitude of oscillation of the fluid dispensed from the fluid dispensing orifices on the die assembly approaching and defining the boundary between areas of fluid coverage and non-coverage on the substrate. In one preferred embodiment, the oscillation amplitude of fluid is increasingly decreased in the several fluid dispensing orifices toward at least one endmost fluid dispensing orifice defining the interface between areas of fluid coverage and non-coverage on the substrate, whereby the at least one endmost fluid dispensing orifice has a smallest oscillation amplitude. Each die assembly has at least two and possibly more fluid dispensing orifices, depending on the configuration thereof, that dispense fluid defining boundaries between areas of fluid coverage and non-coverage on the substrate.

FIG. 2*b* illustrates, for example, the air dispensing orifices 151 being disposed increasingly farther away from the corresponding fluid dispensing orifices 12 toward the left side 156 of the plate 150, thereby increasingly decreasing the oscillation amplitude of fluid dispensed from the respective fluid dispensing orifices, whereby fluid dispensed from the endmost fluid dispensing orifice has the smallest oscillation amplitude, which is controllable most accurately, thereby providing a most well defined boundary. The oscillation amplitude may alternatively be controlled, that is increased or decreased, by varying a relative angle between the fluid and air dispensing orifices.

According to a related aspect of the invention, the fluid supplied to the fluid dispensing orifices having fluid flows with reduced oscillation amplitudes is correspondingly reduced, since less fluid is required for smaller oscillation amplitude. The corresponding air dispensing orifices may be reduced similarly, since the reduced fluid flows may be controlled with reduced air flows.

While the foregoing written description of the invention enables one of ordinary skill in the art to make and use what is at present considered to be the best mode of the invention, it will be appreciated and understood by those of ordinary skill the existence of variations, combinations, modifications and equivalents within the spirit and scope of the specific exemplary embodiments disclosed herein. The present invention is therefore to be limited not by the specific exemplary embodiments disclosed herein but by all embodiments within the scope of the appended claims.

What is claimed is:

1. A system useable for applying fluids including fiberized adhesives onto a substrate from at least one die assembly mountable on a mounting surface of a manifold that supplies fluid to the at least one die assembly, the at least one die assembly selected from a group consisting essentially of:

a first die assembly having a first plurality of fluid dispensing orifices disposed across a first portion of a first dispensing surface extending from one of the right and left sides of the first die assembly toward a first intermediate portion of the first die assembly, and a remaining first portion of the first die assembly extending from the first intermediate portion toward the other of the left and right sides of the first die assembly void of fluid dispensing orifices;

a second die assembly having a second plurality of fluid dispensing orifices disposed across right and left lateral portions of a second dispensing surface of the second die assembly extending from right and left sides of the second die assembly, and a remaining second portion of the second dispensing surface intermediate the right and left lateral portions of the second die assembly void of fluid dispensing orifices, a third die assembly having a third plurality of fluid dispensing orifices disposed across a third intermediate portion of a third dispensing surface, the third intermediate portion spaced from right and left sides of the third die assembly, and remaining right and left lateral portions of the third dispensing surface of the third die assembly void of fluid dispensing orifices.

2. The system of claim 1, the first portion of the first die assembly with the first plurality of fluid dispensing orifices having a minimum width of approximately 1/16 inches, and the remaining first portion of the first die assembly void of fluid dispensing orifices having a minimum width of approximately 1/16 inches.

3. The system of claim 1, the right and left lateral portions of the second die assembly with the second plurality of fluid dispensing orifices each having a minimum width of approximately 1/16 inches, and the remaining second intermediate portion of the second die assembly void of fluid dispensing orifices having a minimum width of approximately 1/8 inches.

4. The system of claim 1, the third intermediate portion of the third die assembly with the third plurality of fluid dispensing orifices having a minimum width of approximately 1/8 inches, and the remaining right and left lateral portions of the third die assembly void of fluid dispensing orifices having a minimum width of approximately 1/16 inches.

5. The system of claim 1, the manifold supplying fluid to a plurality of at least two die assemblies, at least two of the plurality of die assemblies each selected from a corresponding group consisting essentially of the first, second and third die assemblies.

6. The system of claim 5, the plurality of die assemblies mounted on a common mounting surface of the manifold.

7. The system of claim 6, the plurality of die assemblies arranged so that the plurality of fluid dispensing orifices of the plurality of die assemblies form not more than a single substantially linear array of fluid dispensing orifices.

8. The system of claim 1, each of the plurality of fluid dispensing orifices of the first, second and third die assemblies flanked by an air dispensing orifice disposed on opposing sides of the fluid dispensing orifice, the at least one die assembly having air dispensing orifices disposed on at least a portion of the remaining portion void of fluid dispensing orifices.

9. The system of claim 1, each of the plurality of fluid dispensing orifices of the first, second and third die assemblies flanked by an air dispensing orifice disposed on opposing sides of the fluid dispensing orifice, the at least one die assembly having air dispensing orifices arranged relative to the fluid dispensing orifices to increasingly decrease an oscillation amplitude of fluid dispensed from fluid dispensing orifices toward at least one endmost fluid dispensing orifice, whereby fluid dispensed from the at least one endmost fluid dispensing orifice has a smallest oscillation amplitude.

10. The system of claim 9, the at least one die assembly having the air dispensing orifices arranged relative to the fluid dispensing orifices to increasingly decrease the oscillation amplitude of fluid dispensed from the fluid dispensing orifices having different sized fluid dispensing orifices, whereby the size of the fluid dispensing orifices decreases with decreasing fluid oscillation amplitude.

11. The system of claim 1, the first, second and third die assemblies are meltblowing die assemblies comprising a plurality of laminated members useable for spraying hot melt adhesive onto the substrate.

12. A system useable for applying fluids including fiberized adhesives onto a substrate, the system comprising:

a manifold having a mounting surface on which at least one die assembly is mountable, the manifold supplying fluid to the at least one die assembly;

a first die assembly having a first plurality of fluid dispensing orifices disposed across a first portion of a first dispensing surface extending from one of the right and left sides of the first die assembly toward a first intermediate portion of the first die assembly, a remaining first portion of the first dispensing surface extending from the first intermediate portion toward the other of the left and right sides of the first die assembly void of fluid dispensing orifices.

13. The system of claim 12, the first portion of the first die assembly having the first plurality of fluid dispensing orifices having a minimum width of approximately 1/16 inches, and the remaining first portion of the first die assembly void of fluid dispensing orifices having a minimum width of approximately 1/16 inches.

14. The system of claim 12, each of the plurality of fluid dispensing orifices of the first die assembly flanked by an air dispensing orifice disposed on opposing sides of the fluid dispensing orifice, the first die assembly having air dispensing orifices disposed on at least a portion of the remaining first portion of the first die assembly void of fluid dispensing orifices.

15. The system of claim 12, each of the plurality of fluid dispensing orifices of the first die assembly flanked by an air dispensing orifice disposed on opposing sides of the fluid dispensing orifice, the air dispensing orifices arranged relative to the fluid dispensing orifices to increasingly decrease an oscillation amplitude of fluid dispensed from fluid dispensing orifices toward at least one endmost fluid dispensing orifice, whereby fluid dispensed from the at least one endmost fluid dispensing orifice has a smallest oscillation amplitude.

16. The system of claim 15, the die assembly having air dispensing orifices arranged relative to the fluid dispensing orifices to increasingly decrease the oscillation amplitude of fluid dispensed from the fluid dispensing orifices having different sized fluid dispensing orifices, whereby the size of the fluid dispensing orifices decreases with decreasing fluid oscillation amplitude.

17. The system of claim 12, the manifold supplying fluid to a plurality of at least two die assemblies, the system further comprising:

at least a second die assembly having a second plurality of fluid dispensing orifices disposed across a second portion of a second dispensing surface extending from one of the right and left sides of the second die assembly toward a second intermediate portion of the second die assembly, a remaining second portion of the second dispensing surface extending from the second intermediate portion toward the other of the left and right sides of the second die assembly void of fluid dispensing orifices.

18. The system of claim 17, the second plurality of fluid dispensing orifices disposed on the second dispensing surface of the second die assembly opposite the first plurality of fluid dispensing orifices disposed on the first dispensing surface of the first die assembly, whereby the first die assembly and the second die assembly are mountable side by side on the manifold so that the plurality of first fluid dispensing orifices of the first die assembly are positionable adjacent the plurality of second fluid dispensing orifices of the second die assembly.

19. The system of claim 17, the plurality of die assemblies mounted on a common mounting surface of the manifold.

20. The system of claim 19, the plurality of die assemblies arranged so that the plurality of fluid dispensing orifices of the plurality of die assemblies form not more than a single substantially linear array of fluid dispensing orifices.

21. The system of claim 17, the plurality of die assemblies are meltblowing die assemblies each comprising a plurality of laminated members useable for spraying hot melt adhesive onto the substrate.

22. The system of claim 12, the manifold supplying fluid to a plurality of at least two die assemblies, the system further comprising:

at least a second die assembly having a second plurality of fluid dispensing orifices disposed across a second intermediate portion of a second dispensing surface, the second intermediate portion spaced from right and left sides of the second die assembly, remaining right and left lateral portions of the second dispensing surface of the second die assembly void of fluid dispensing orifices.

23. The system of claim 12, the manifold supplying fluid to a plurality of at least two die assemblies, the system further comprising:

at least a third die assembly having a third plurality of fluid dispensing orifices disposed across right and left lateral portions of a third dispensing surface of the third die assembly extending from right and left sides of the third die assembly, a remaining third portion of the third dispensing surface intermediate the right and left lateral portions of the third die assembly void of fluid dispensing orifices.

24. A system useable for applying fluids including fiberized adhesives onto a substrate, the system comprising:

a manifold having a mounting surface on which at least one die assembly is mountable, the manifold supplying fluid to the at least one die assembly;

at least a first die assembly having a first plurality of fluid dispensing orifices disposed across a first intermediate portion of a first dispensing surface, the first intermediate portion spaced from right and left sides of the first die assembly, remaining right and left lateral portions of the first dispensing surface of the first die assembly void of fluid dispensing orifices.

25. The system of claim 24, the first intermediate portion of the first die assembly having the first plurality of fluid dispensing orifices having a minimum width of approximately ⅛ inches, and the remaining right and left lateral portions of the first die assembly void of fluid dispensing orifices having a minimum width of approximately 1/16 inches.

26. The system of claim 24, the manifold supplying fluid to a plurality of at least two die assemblies, the system further comprising:

a second die assembly having a second plurality of fluid dispensing orifices disposed across right and left lateral portions of a second dispensing surface of the second die assembly extending from right and left sides of the second die assembly, a remaining second portion of the second dispensing surface intermediate the right and left lateral portions of the second die assembly void of fluid dispensing orifices.

27. A system useable for applying fluids including fiberized adhesives onto a substrate, the system comprising:

a manifold having a mounting surface on which at least one die assembly is mountable, the manifold supplying fluid to the at least one die assembly;

at least a first die assembly having a first plurality of fluid dispensing orifices disposed across right and left lateral portions of a first dispensing surface of the first die assembly extending from right and left sides of the first die assembly, a remaining first portion of the first dispensing surface intermediate the right and left lateral portions of the first die assembly void of fluid dispensing orifices.

28. The system of claim 27, the right and left portions of the first die assembly each having the first plurality of fluid dispensing orifices having a minimum width of approximately 1/16 inches, and the remaining first intermediate portion of the first die assembly void of fluid dispensing orifices having a minimum width of approximately ⅛ inches.

29. A system useable for applying fluids including fiberized adhesives onto a substrate, the system comprising:

a manifold having a mounting surface on which at least one die assembly is mountable, the manifold supplying fluid to the at least one die assembly;

a die assembly having a plurality of fluid dispensing orifices disposed on a portion of a dispensing surface of the die assembly and arranged at least partially across a width of the die assembly extending from a right side of the die assembly to a left side of the die assembly;

each of the plurality of fluid dispensing orifices of the die assembly flanked by an air dispensing orifice disposed on opposing sides of the fluid dispensing orifice, at least one remaining portion of the dispensing surface of the die assembly void of fluid dispensing orifices, at least a portion of the at least one remaining portion of the dispensing surface void of fluid dispensing orifices and not void of air dispensing orifices.

30. The system of claim 29, the die assembly having air dispensing orifices arranged relative to the fluid dispensing orifices to increasingly decrease an oscillation amplitude of fluid dispensed from fluid dispensing orifices toward at least one endmost fluid dispensing orifice, whereby fluid dispensed from the at least one endmost fluid dispensing orifice has a smallest oscillation amplitude.

31. The system of claim 30, the die assembly having the air dispensing orifices arranged relative to the fluid dispensing orifices to increasingly decrease the oscillation amplitude of fluid dispensed from the fluid dispensing orifices having different sized fluid dispensing orifices, whereby the size of the fluid dispensing orifices decreases with decreasing fluid oscillation.

32. The system of claim 29, the die assembly is a meltblowing die assemblies comprising a plurality of laminated members useable for spraying hot melt adhesive onto the substrate.

33. A method for applying fluids including fiberized adhesives onto a substrate, the method comprising:

supplying fluid to at least a first die assembly mounted on a mounting surface of a manifold;

applying fluid to portions of the substrate substantially opposite a first plurality of fluid dispensing orifices disposed across a first portion of a first dispensing surface extending from one of right and left sides of the first die assembly toward a first intermediate portion of the first die assembly; and not applying fluid to other portions of the substrate substantially opposite a remaining first portion of the first dispensing surface extending from the first intermediate portion toward the other of the left and right sides of the first die assembly void of fluid dispensing orifices.

34. The method of claim 33, each of the plurality of fluid dispensing orifices of the first die assembly flanked by an air dispensing orifice disposed on opposing sides of the fluid dispensing orifice, the method further comprising dispensing air from air dispensing orifices disposed on at least a portion of the remaining first portion of the first die assembly void of fluid dispensing orifices.

35. The method of claim 33, each of the plurality of fluid dispensing orifices of the first die assembly flanked by an air dispensing orifice disposed on opposing sides of the fluid dispensing orifice, the method further comprising decreasing an oscillation amplitude of fluid dispensed from fluid dispensing orifices toward at least one endmost fluid dispensing orifice defining an interface between areas of fluid coverage and non-coverage on the substrate, whereby fluid dispensed from the at least one endmost fluid dispensing orifice has a smallest oscillation amplitude.

36. The method of claim 33 further comprising:

supplying fluid to at least first and second die assemblies mounted on the mounting surface of the manifold;

applying fluid to portions of the substrate substantially opposite a second plurality of fluid dispensing orifices disposed across a second portion of a second dispensing surface extending from one of the right and left sides of the second die assembly toward a second intermediate portion of the second die assembly; and not applying fluid to other portions of the substrate substantially opposite a remaining second portion of the second dispensing surface extending from the second intermediate portion toward the other of the left and right sides of the second die assembly void of fluid dispensing orifices.

37. The method of claim 36 further comprising mounting the plurality of die assemblies on a common mounting surface of the manifold.

38. The method of claim 37 further comprising arranging the plurality of die assemblies so that the plurality of fluid dispensing orifices of the plurality of die assemblies form not more than a single substantially linear array of fluid dispensing orifices.

39. The method of claim 36 further comprising disposing the second plurality of fluid dispensing orifices on the second dispensing surface of the second die assembly opposite the first plurality of fluid dispensing orifices of the first dispensing surface of the first die assembly.

40. The method of claim 33 further comprising:

supplying fluid to at least first and second die assemblies mounted on the mounting surface of the manifold;

applying fluid to portions of the substrate substantially opposite a second plurality of fluid dispensing orifices disposed across a second intermediate portion of a second dispensing surface of the second die assembly, the second intermediate portion spaced from right and left sides of the second die assembly;

not applying fluid to other portions of the substrate substantially opposite remaining right and left lateral portions of the second dispensing surface of the second die assembly void of fluid dispensing orifices.

41. The method of claim 40 further comprising:

supplying fluid to at least first, second and third die assemblies mounted on the mounting surface of the manifold;

applying fluid to portions of the substrate substantially opposite a third plurality of fluid dispensing orifices disposed across right and left lateral portions of a third dispensing surface of the third die assembly extending from right and left sides of the third die assembly; and not applying fluid to other portions of the substrate substantially opposite a remaining third portion of the third dispensing surface intermediate the right and left lateral portions of the third die assembly void of fluid dispensing orifices.

42. A method for applying fluids including fiberized adhesives onto a substrate, the method comprising:

supplying fluid to at least a first die assembly mounted on a mounting surface of a manifold;

applying fluid to portions of the substrate substantially opposite a first plurality of fluid dispensing orifices disposed across a first intermediate portion of a first dispensing surface of the first die assembly, the first intermediate portion spaced from right and left sides of the first die assembly;

not applying fluid to other portions of the substrate substantially opposite remaining right and left lateral portions of the first dispensing surface of the first die assembly void of fluid dispensing orifices.

43. The method of claim 42 further comprising:

supplying fluid to at least first and second die assemblies mounted on the mounting surface of the manifold;

applying fluid to portions of the substrate substantially opposite a second plurality of fluid dispensing orifices disposed across right and left lateral portions of a second dispensing surface of the second die assembly extending from right and left sides of the second die assembly; and not applying fluid to other portions of the substrate substantially opposite a remaining second portion of the second dispensing surface intermediate the right and left lateral portions of the second die assembly void of fluid dispensing orifices.

44. A method for applying fluids including fiberized adhesives onto a substrate, the method comprising:

supplying fluid to at least a first die assembly mounted on a mounting surface of a manifold;

applying fluid to portions of the substrate substantially opposite a first plurality of fluid dispensing orifices disposed across right and left lateral portions of a first dispensing surface of the first die assembly extending from right and left sides of the first die assembly; and not applying fluid to other portions of the substrate substantially opposite a remaining first portion of the first dispensing surface intermediate the right and left lateral portions of the first die assembly void of fluid dispensing orifices.

45. A method for applying fluids including fiberized adhesives onto a substrate, the method comprising:

supplying fluid to at least one die assembly mounted on a mounting surface of a manifold;

applying fluid to portions of the substrate substantially opposite a plurality of fluid dispensing orifices disposed on a portion of a dispensing surface of the die assembly, the plurality of fluid dispensing orifices arranged at least partially across a width of the die assembly extending from a right side of the die assembly to a left side of the die assembly, each of the plurality of fluid dispensing orifices of the die assembly flanked by an air dispensing orifice disposed on opposing sides of the fluid dispensing orifice, not applying fluid to other portions of the substrate substantially opposite at least one remaining portion of the dispensing surface of the die assembly void of fluid dispensing orifices, at least a portion of the at least one remaining portion of the dispensing surface void of fluid dispensing orifices not void of air dispensing orifices; and dispensing air from the air dispensing orifices on the portion of the at least one remaining portion of the dispensing surface void of fluid dispensing orifices.

46. The method of claim 45 further comprising decreasing an oscillation amplitude of fluid dispensed from fluid dispensing orifices toward at least one endmost fluid dispensing orifice defining an interface between areas of fluid coverage and non-coverage on the substrate, whereby fluid dispensed from the at least one endmost fluid dispensing orifice has a smallest oscillation amplitude.

* * * * *